United States Patent [19]

Black et al.

[11] 4,426,607

[45] Jan. 17, 1984

[54] DIFFERENTIAL LINKAGE APPARATUS FOR AN AIRCRAFT SERIES SERVOACTUATOR APPARATUS

[75] Inventors: Homer D. Black, Phoenix; Charles R. Stribley, Scottsdale, both of Ariz.

[73] Assignee: Sperry Corporation, New York, N.Y.

[21] Appl. No.: 357,532

[22] Filed: Mar. 12, 1982

[51] Int. Cl.³ .............................................. G05B 11/01
[52] U.S. Cl. .................................. 318/628; 318/580; 318/584; 318/586; 318/626; 244/223
[58] Field of Search ............... 318/584, 586, 626, 585, 318/628, 580, 467; 244/223

[56] References Cited

U.S. PATENT DOCUMENTS 3,369,161 2/1968 Kaufman ........................ 318/626 X
3,733,039 5/1973 O'Conner et al. .............. 318/585 X
4,228,386 10/1980 Griffith ............................. 318/628
4,313,165 1/1982 Clelford et al. ................ 318/628 X Primary Examiner—B. Dobeck
Attorney, Agent, or Firm—Howard P. Terry

[57] ABSTRACT

In a servoactuator system for an aircraft, a strapdown series servoactuator having an external linkage assembly is coupled between the pilot's control stick and a control surface member. The external linkage assembly includes a differential link and servo link having specially tapered stop surfaces adapted to be varied in dimensions to accommodate a wide variety of installations, which stop surfaces cooperate with fixed stops on the servoactuator housing whereby to provide a variety of pilot authority limits and series servo authority limits depending upon particular installation requirements.

3 Claims, 6 Drawing Figures

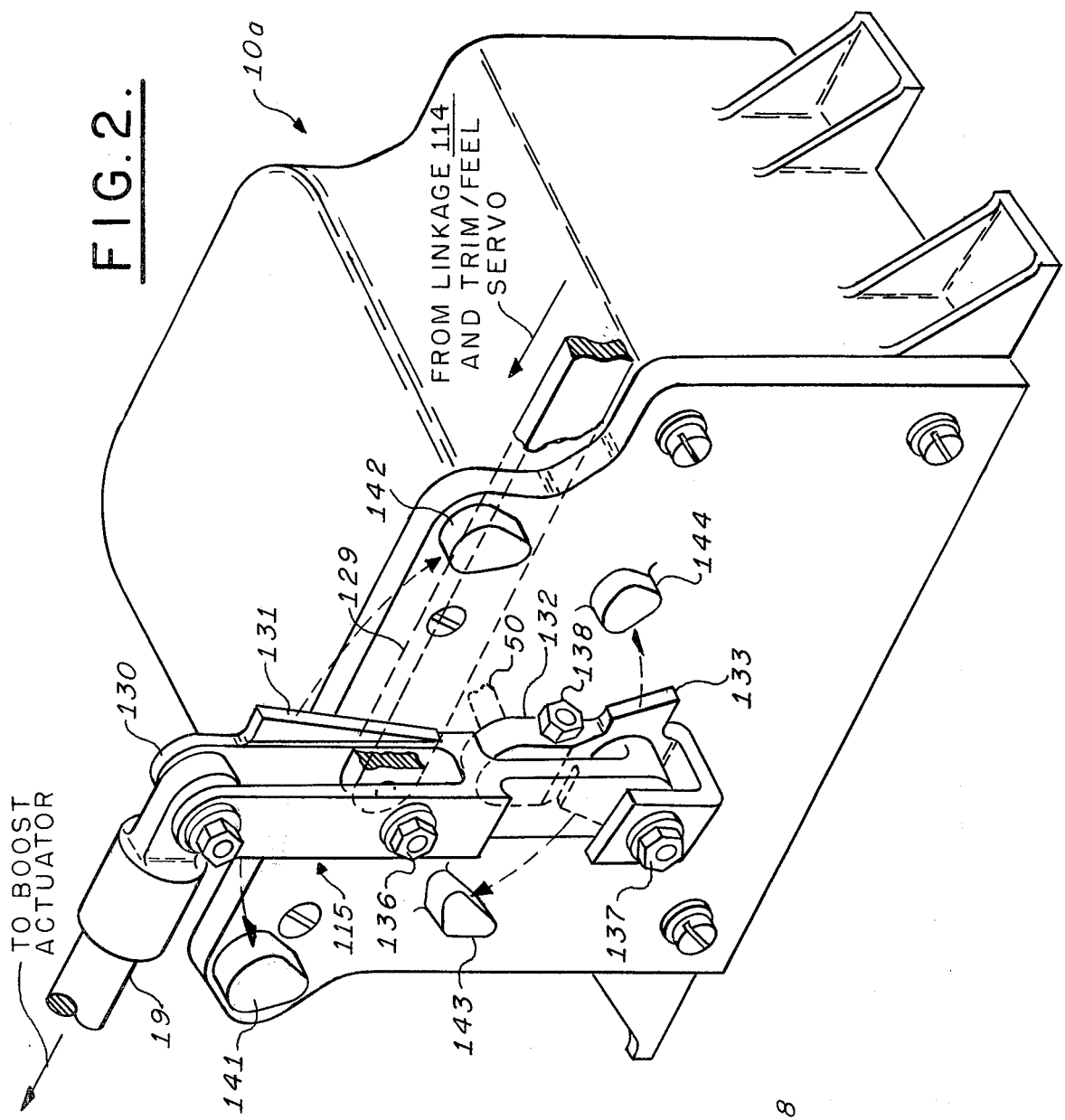
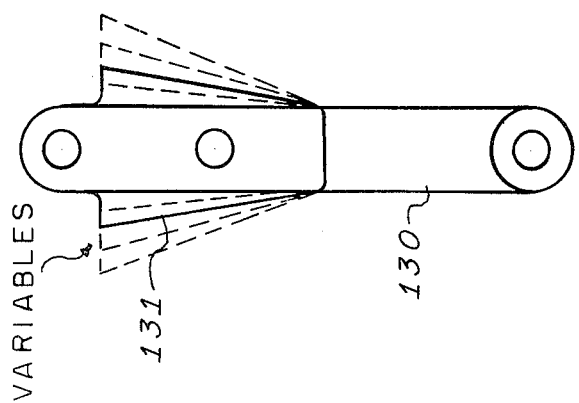
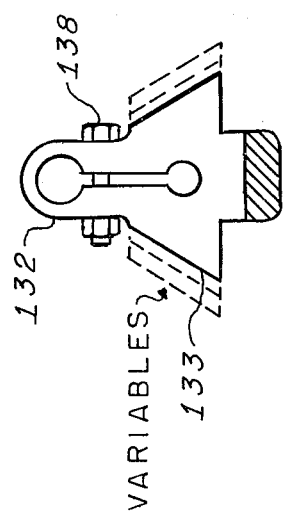

DIFFERENTIAL LINKAGE APPARATUS FOR AN AIRCRAFT SERIES SERVOACTUATOR APPARATUS

BACKGROUND OF THE INVENTION

1. Field of the Invention

The present invention relates to control actuators for aircraft, particularly helicopters and, more particularly, to improvements in a strapdown servoactuator.

2. Description of the Prior Art

The installation of an automatic Stability Augmentation System (SAS) or an Automatic Flight Control System (AFCS) as original or retrofit aircraft equipment, particularly in helicopters, normally comprises a number of separated components usually located at separate and convenient points in the control rigging. Such components include a series actuator, usually contained within a control rod for increasing or decreasing its length in accordance with an electrical command from the SAS or AFCS computer, automatic and manual control authority limit stops, stick position transducers, an artificial feel spring mechanism having detent switches and a manual and/or automatic trim actuator and brake mechanism, and the like. In the retrofit of such actuators and associated components particularly in helicopters, the installation is more difficult, involving costly and time consuming modifications to the existing manual flight controls and linkage systems. As the above items are typically required for each axis of control, the SAS and/or AFCS original installation and retrofit becomes extremely difficult and time consuming adding not only to the aircraft's over-all-weight but also, significantly, to its total cost of ownership, considering maintenance and replacement costs.

Aircraft servoactuators are generally of two types: parallel and series, both of which are well known in the aircraft automatic control art. The parallel actuator is hard-mounted or bolted directly to the airframe and thus not severely affected by a high vibration environment as compared with conventional series actuator installations. A parallel actuator system is normally the autopilot actuator wherein its movement is reflected both at the control surface and the control stick. A series actuator, however, is not normally secured to the aircraft body structure but, rather is coupled in the control linkages or push-rod assemblies between the pilot's stick and the control surface; that is, it is floating or ungrounded and hence severely and adversely affected in the high vibration environment usually associated with a helicopter. The series servo motion does not move the pilot's stick and normally has a limited control authority over the control surface. Furthermore, as stated, the series actuator is usually installed in the control push-rods which, particularly in a retrofit situation, alters their natural resonances to local vibrations such as produced by the sustaining rotor.

A strapdown multifunction servoactuator which alleviates to a large extent the shortcomings of the above-described prior art is described in copending application Ser. No. 176,321, filed Aug. 8, 1980 entitled "Strapdown Multifunction Servoactuator Apparatus for Aircraft", by Carl D. Griffith and Kenneth L. Oliver and assigned to Sperry Corporation. The strapdown multifunction servoactuator of the above reference comprises one or two integral units adapted for installation in an aircraft, particularly a helicopter, and coupled between the pilot's control stick linkage and the aircraft control surface (or surface servo boost) linkage. The multifunction servoactuator performs the functions of series actuation, trim actuation, artificial feel, control position sensing, and control authority limits. The apparatus includes a series actuator installed in the vehicle and connected to the vehicle control linkages in the conventional parallel actuator manner; that is, it is secured directly or strapped down to the airframe and therefore greatly simplifies control system installation and reduces problems such as those associated with control rod vibration resonances normally encountered with conventional integral-with-linkage series actuator installations.

The series actuator of the above-described multifunction servoactuator, however, includes an external linkage assembly having a differential link which is an open framework coupled to a series servo link. The differential link has contact surfaces which contact contoured stop surfaces mounted on the apparatus housing. These surfaces are contoured such that when the manual command exceeds the authority limits, any motion of the series servo link produces a vertical motion of the output linkage point with negligible translational component. In order to accommodate the authority limit requirements of a large number of aircraft installations, various configurations of the contoured authority limit stop block must be available. It will be appreciated that this contoured stop block is rather complex and very expensive to manufacture. Furthermore, the open framework of the differential link may be too fragile and in some instances may not carry the imposed mechanical loads. Moreover, the open framework design is also difficult and expensive to manufacture. Accordingly, there is a need for less costly and less complex linkage assembly suitable for coupling a strapdown series servoactuator between a control surface and the pilot's control stick or feel trim actuator.

SUMMARY OF THE INVENTION

In accordance with the teachings of the present invention, the difficulties associated with a strapdown series servoactuator are to a great extent eliminated.

Specifically, the strapdown series servoactuator apparatus of the present invention comprises a housing adapted to be bolted to the airframe and having an external differential linkage assembly coupled to the pilot's control stick and to the associated control surface or swash plate or the power boost actuator therefor. The differential linkage assembly may be coupled to the control stick directly or via a second linkage assembly connected with a trim actuator assembly including stick position sensors, an artificial feel element, a trim servomotor through an irreversible drive, and a magnetic clutch and damper mechanism. The differential linkage assembly coupled with the control surface (or boost actuator) is also connected to a single series servomotor through an irreversible drive, or to dual series servomotors through irreversible drives and a differential, and to series servo position sensors. The differential linkage assembly includes a series servo link and a differential link coupled between the control surface, the series servo link and the control stick linkage which permits direct operation of the control surface from the series servo and/or from the control stick due to the irreversible series servo drive. Both the differential link and the series servo link include specially tapered stop surfaces which cooperate with fixed stops or bosses on a servo cover plate. The width and slope of the tapered surfaces may be varied to adapt the links to the specific limit requirements of a particular installation. Further, the slope of the stop surfaces is configured such that, when abutting the housing stops, further movement of the differential link by either of its inputs will not result in any significant translation of the output linkage to the boost actuator. The cooperating tapered and fixed stops are configured so as to limit the control authority of the series servo to a predetermined value and that of the pilot's stick to a predetermined constant value regardless of the series servo link position. In accordance with the present invention, the authority limit requirements of a large number of different aircraft may be satisfied with two basic, easily fabricated parts; the differential link and the servo actuator link, each link originally having stop surfaces providing a required minimum control authority, which stop surfaces may be easily ground down and contoured to provide any of a plurality of greater authorities to a required maximum.

BRIEF DESCRIPTION OF THE DRAWINGS

FIG. 2 is an external view of a series actuator utilizing the differential linkage apparatus of the present invention;

FIGS. 4A and 4B are plan views of the differential link and servo link of the actuator of FIG. 2 and illustrating how they may be varied to provide a plurality of control authorities.

DESCRIPTION OF THE PREFERRED EMBODIMENT

Figure 1A:
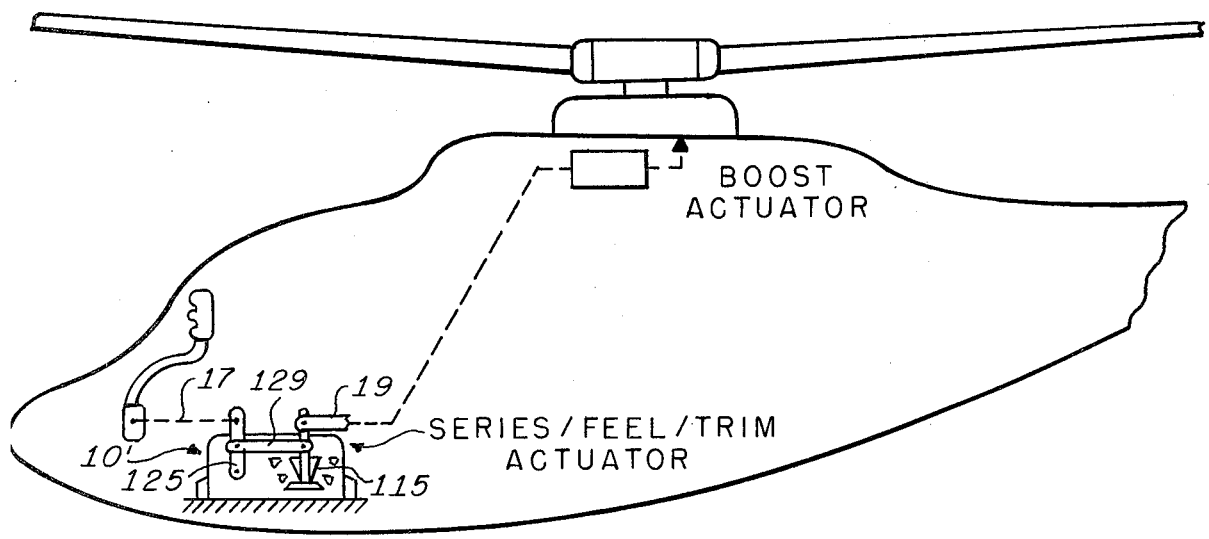
FIGS. 1A and 1B are illustrations of strapdown servoactuators utilizing the apparatus of the present invention.
Figure 1B:
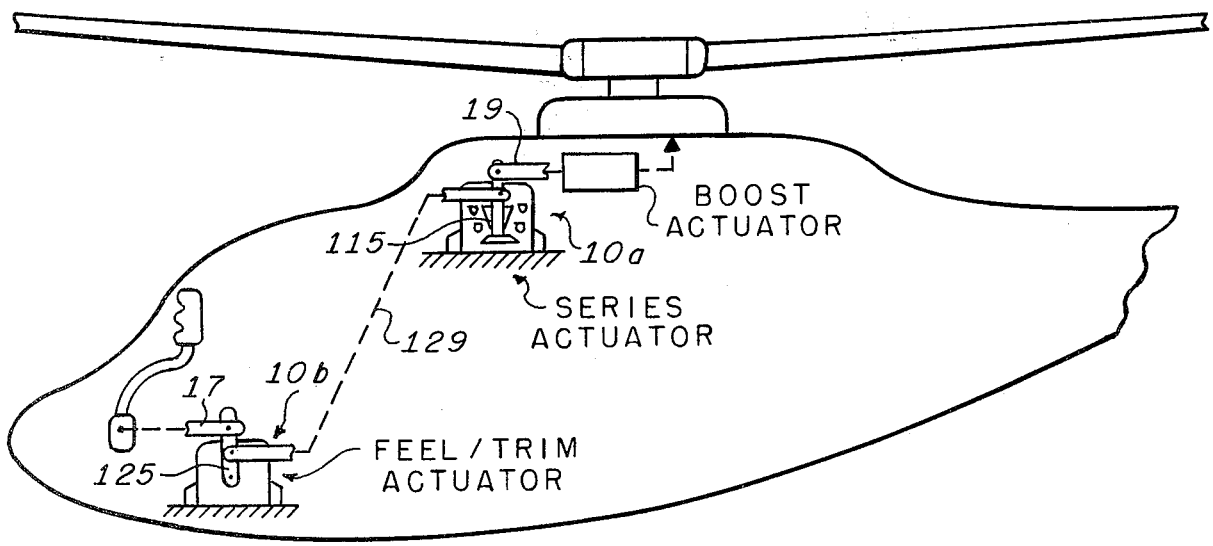

FIGS. 1A and 1B illustrate two typical installations of a strapdown servoactuator utilizing the apparatus of the present invention. FIG. 1A illustrates a single integral structure or housing 10' strapped down to the airframe including a connection link 29, while FIG. 1B illustrates this apparatus as two separate housings, 10a and 10b, strapped down to the airframe at relatively remote positions in the helicopter and interconnected by common link 129. It will be understood, of course, that the two housings 10a and 10b of FIG. 1B may be bolted or otherwise integrally joined together to form the housing 10' of FIG. 1A or alternately may be bolted down to the airframe adjacent each other.

Referring now to FIG. 2, there is illustrated pictorially the series actuator portion 10a of the strapdown servoactuator utilizing the apparatus of the present invention installed as in FIG. 1B. It comprises generally an investment cast housing 10a having mounting flanges 11 by which it may be secured directly to suitably drilled mounting surfaces or rigid structural members which are part of the aircraft's basic structure or airframe. The location of the actuator in the aircraft is selected, typically as in FIG. 1B, so that it is conveniently adjacent to the control system. In the embodiment illustrated, the actuator includes an external linkage assembly 115, the linkage 115 being connected by a mechanical linkage 129 to a second external linkage 114. The linkage 114 is connected to the flight control system push-rod 17 coupled with the pilot's controller, such as the helicopter cyclic control stick shown in FIG. 1B. The linkage assembly 115 is connected to the flight control system push-rod 19 coupled with the flight control surface, or as is familiar to those skilled in this art, to a servo boost actuator which in turn operates the surface also as shown in FIG. 1B. It will be understood, of course, that the actuator linkages 17 and 19 may be connected with corresponding or equivalent control cables characteristic of fixed wing aircraft rigging and these connections may be generally referred to as actuation members. As is of course known, in a helicopter, its pitch and roll attitude are controlled by tilting the sustaining rotor by operation of the cyclic stick, yaw attitude is controlled through changing the thrust of the anti-torque propeller (in single rotor helicopters) by operation of the "rudder" pedals while craft vertical motion is controlled by controlling the thrust or lift of the sustaining rotor by operation of the collective stick. The strapdown servoactuator apparatus of the present invention may be used with any one or all of these flight controllers. Therefore, in the present specification, it will be understood that the use of the term control surface should be construed as pertaining not only to all of these helicopter control mechanisms, but also to fixed wing aircraft control surfaces.

The linkage assembly 115 is coupled with the control surface, and hence may be referred to as the output linkage. According to the present invention, the linkage assembly 115 comprises a differential link 130 having a specially tapered stop engaging surface 131 and a servo link 132 also having a specially tapered stop engaging surface 133. The upper end of the differential link 130 is a bifurcated yoke pivotally attached to the control surface push-rod 19 by suitable bolt and nut fasteners 135. The parallel link 129 is also pivotally fastened to the bifurcated yoke portion of the differential link 130 intermediately of the push-rod 19 connection and servo link connection by suitable bolt and nut fasteners 136. The lower portion of the differential link 130 is pivotally connected to servo link 132 by suitable bolt and nut fasteners 137. The servo link 132 is clamped to a splined servo driven shaft 50 protruding from the series servo assembly 10a by a nut and bolt 138.

The series actuator assembly 10a further includes a side wall or cover plate 140 detachably secured to the actuator housing and having a plurality of fixed bosses 141, 142, 143 and 144 which are symmetrically angularly disposed relative to the drive shaft 50 and which constitute stops cooperating with the tapered surfaces 131 and 133 for limiting the angular displacement of the differential link 130 and the servo link 132, respectively. The stops 141, 142 prevent the tapered surface 131 of differential link 130 from exceeding a predetermined travel limit which is referred to herein as the manual authority limit. The stops 143, 144 prevent the tapered surface 133 of the servo link 132 from exceeding a predetermined travel limit which is referred to herein as the series servo authority limit.

Referring back to FIG. 1B, the linkage 114, which may be referred to as the input linkage, comprises an elongated bar link 125 to the upper end of which is pivotally fastened the control stick linkage 17 by means of suitable bolt and nut fasteners. The lower end of bar link 125 is fixedly clamped to a shaft extending from within the feel/trim actuator 10b. At a point intermediate the ends of link 125 is pivoted one end of the mechanical linkage 129 by similar bolt and nut connection all as described more fully in the above-referenced copending application. Also, since the structure and operation of the feel/trim actuator is described in detail in this copending application, it will not be repeated herein.

Figure 3:
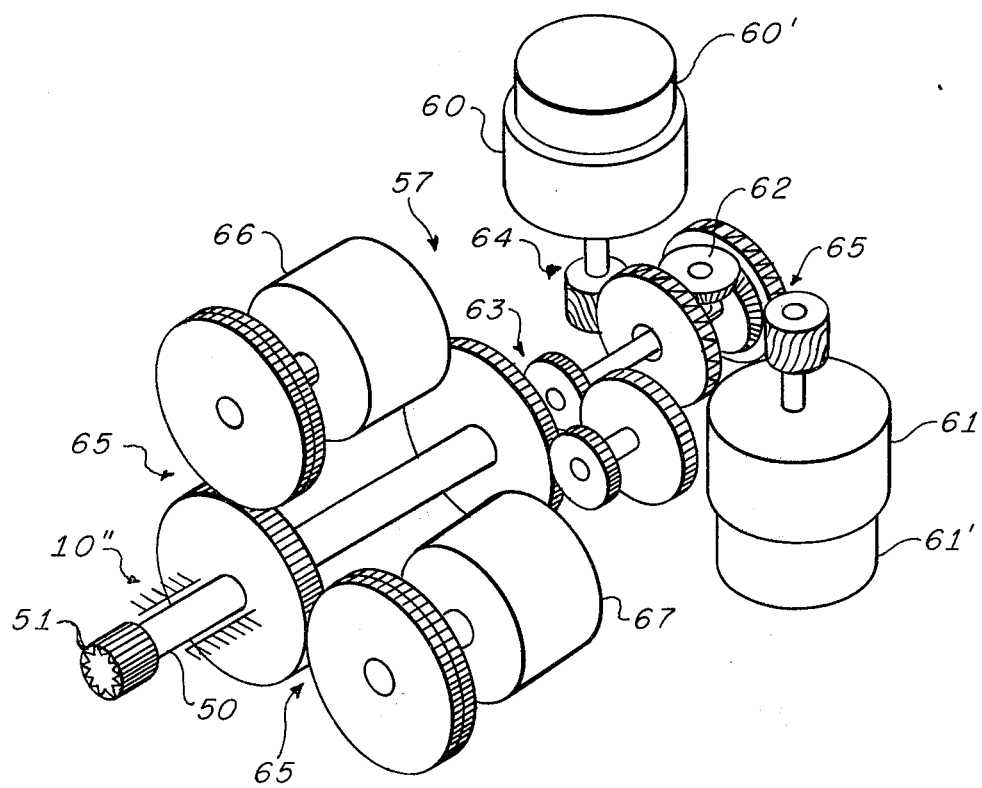
FIG. 3 is a schematic of the principal elements contained within the series actuator housing of FIG. 2.

The elements within the series servoactuator housing 10a of the present invention and associated with its output shaft 50 and hereinafter referred to as the series servoactuator assembly, will now be described for completeness. Refer to FIG. 3, the shaft 50 to which is secured the servo link 132 is connected to be driven by dual servomotors 60 and 61 through differential gearing 62 and gear train 63. Motors 60 and 61 each include a tachometer 60', 61' for providing a series servosystem damping signal in a conventional fashion. In accordance with the present invention, the servomotors 60 and 61 drive shaft 50 through irreversible gear trains 64 and 65, respectively, so that the servo link 132 cannot drive backwardly into the servomotors and therefore effectively provide at the pivot connection formed by bolt and fastener 137 a fixed but servo adjustable pivot point for the differential link 130. Thus, the drive link 132 is prevented from being positioned except by operation of the servomotors. Driven from shaft 50 through anti-backlash gearing 65 are further signal generators or synchros 66 and 67. These synchros provide surface position feedback signals for the servosystem energizing the servomotors 60 and 61. It should be noted here that the series servo function of the actuator of the present invention is provided by dual servomotors 61 and 62 acting jointly through differential 62 as taught in a number of the present assignee's patents, such as U.S. Pat. Nos. 3,504,248; 4,035,705; 4,094,481; 4,159,444 and 4,162,438. However, it will be understood that the actuator of the present invention is equally applicable in systems employing a single servomotor, it being important of course that it drives shaft 50 through an irreversible gearing or equivalent mechanism.

It should be noted that FIG. 1A illustrates another installation utilizing the apparatus of the present invention wherein the feel/trim actuator 10b with its internal elements are enclosed in a unitary housing 10' and wherein the series actuator 10a with its internal elements 57 are also enclosed in the same unitary housing 10' as described in the copending application. Alternatively, the feel/trim actuator housing 10b and series servo housing 10a, if separate units, may be strapped down to the airframe structure at the same general location and connected by the link 129 also as described in the copending application.

Referring back to FIG. 2, the authority limit mechanism of the present invention includes two authority limits, one for limiting the range of authority of the series servo over the control surface displacement whereby to limit surface deflection to this authority and the other for limiting the range of the authority of the control stick over the control surface displacement as defined by the particular aircraft characteristics, regardless of the position of the series servo. In accordance with the teachings of the present invention, both of these displacement limits are provided by the specially designed servo link 132 and the specially designed differential link 130.

Analysis of the control stick and series servo authority limit requirements of a large number of aircraft control systems, particularly those of helicopters, results in the establishment of a plurality of authority limits which must be accommodated by the series servo installation for those aircraft. These maximum authority limits will range between maximum and minimum values depending upon which specific aircraft model the series servo is to be installed. Thus, given the fixed housing stop separations as illustrated in FIG. 2, the manual and series servo maximum and minimum authority limits which must be accommodated for a plurality of installation requirements are established by the maximum and minimum dimensions and contours of the stop surfaces 131 on the differential link 130 and those of the stop surfaces 133 on series servo link 132. Such dimensions and contours limit the maximum angular displacement of the differential link 130 and the maximum angular displacement of the servo link 133. Thus, given the installation requiring the minimum angular displacements of each link, each link is manufactured to satisfy this minimum throw, that is, the stop flanges 131 and 133 are manufactured to the outermost dimensions illustrated by the outermost dotted lines of FIGS. 4A and 4B, respectively. Now, all other installations requiring angular displacements greater than the minimum, the stop flanges may be very easily machined down to the extent required to meet such specifications as illustrated by the other dotted line dimensions of FIGS. 4A and 4B. As illustrated, the angular dimension of the stop surfaces also change in a predetermined ratio with the lateral dimension. In the case of the series servo link stop surface 133, its angular dimension need be changed only to the extent necessary to assure substantial parallelism with the surfaces of housing stops 143 and 144 when these surfaces are engaged. However, the angular dimension of the differential link stop surfaces must be varied so as to assure that when its surfaces contact the housing stops 141 and 142, any angular movement of the series servo link results in a vertical displacement only of the output push-rod 19; that is, such movement has no effective lateral component.

While the variable stop capability just described will accommodate a large number of difficult installations, it will be recognized of course, that the adaptability of the series servoactuator of the present invention may be increased to a still greater variety of installations by providing detachably mounted servo housing cover plates 140 having different angular dimensions between the stop bosses 141, 142 and 143, 144.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. A series servoactuator for installation in an aircraft comprising:
    (a) a servomotor having a housing adapted to be secured to the airframe and coupled between a pilot's control linkage and a control surface linkage and including a servomotor output drive shaft extending from a side wall of said housing,
    (b) first and second pairs of stop means fixed on said housing side wall, each pair being symmetrically angularly spaced relative to said drive shaft,
    (c) a servo drive link secured to said drive shaft having first stop engaging surfaces thereon adapted to engage said first pair of housing stop means for limiting the authority of said servomotor,
    (d) an elongated differential link having one end pivotally mounted on said servo drive link, having its opposite end pivotally connected to said control surface linkage and having an intermediate point thereon pivotally connected to said pilot's control linkage, said differential link having second stop engaging surfaces thereon adapted to engage said second pair of housing stop means for limiting the authority of said pilot's control linkage, said second stop engaging surfaces of said differential link having a contour such that when they engage one or the other of said second housing stop means, any motion of said servo link will result in no effective motion of said differential link and control surface linkage; and said differential link being further characterized in that said second stop engaging surfaces comprise flange means laterally extending from the differential link, the lateral dimension thereof being variable between predetermined values dependent upon the authority limits required by the pilot's control linkage of a particular aircraft installation.

2. The series servoactuator as set forth in claim 1 wherein said servo link is further characterized in that said first stop engaging surfaces comprise flange means laterally extending from the servo link, the lateral dimension thereof being variable between predetermined values dependent upon the authority limits required by the servomotor of a particular aircraft installation.

3. The series servoactuator as set forth in claims 1 and 2 wherein said housing sidewall including said first and second stop means is detachably secured to said servomotor housing and replaceable with another housing sidewall having first and second stop means at different symmetrical angular dispositions relative to said drive shaft.

* * * * *